Patented Apr. 19, 1949

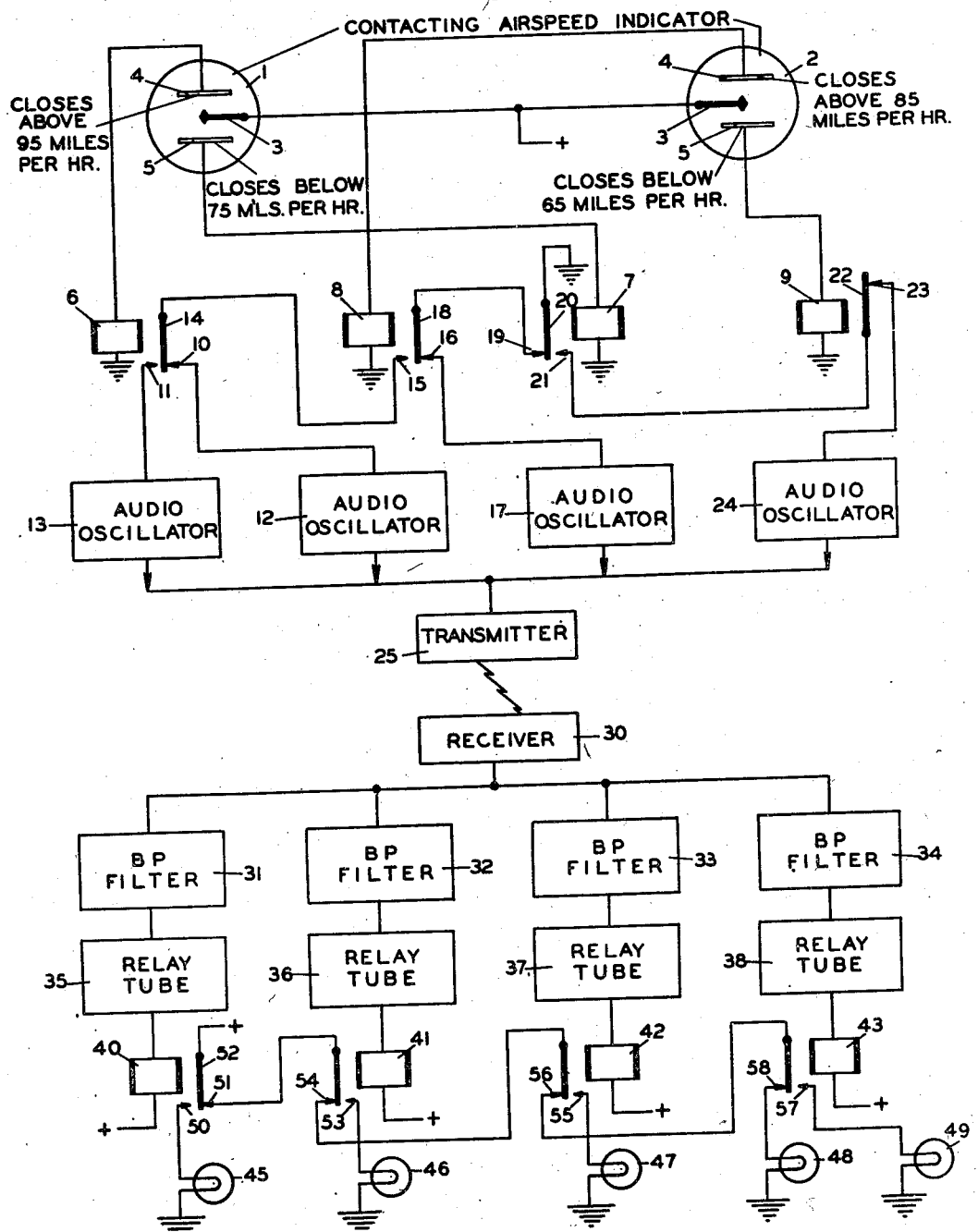

2,467,400

UNITED STATES PATENT OFFICE 2,467,400

AUTOMATIC TRANSMISSION OF DATA FROM AIRCRAFT

Peter R. Murray, Dayton, Ohio

Application August 1, 1945, Serial No. 608,345

3 Claims. (Cl. 177—380)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to remote indicating systems and more particularly to a system of telemetering data from a pilotless vehicle to a remote control station.

In radio systems for controlling pilotless vehicles such as target aircraft, there are instances when it is desirable to automatically provide the remote control operator with information concerning a controllable state, such as airspeed, of the vehicle. For example, in landing a pilotless airplane by remote control precautions should be taken on the one hand to insure that the plane is not traveling too fast for a landing and on the other hand that its speed does not become so low as to cause stalling. It may be further desired to bring the airspeed of the craft within a particular range of values considered safe for landing.

In view of the foregoing considerations, it is advantageous that a system be provided for indicating to the remote control operator the approximate airspeed of the pilotless aircraft, and so to do is an object of this invention. It should be understood, of course, that the invention is not limited to furnishing airspeed indications, but may be adapted to the transmission of data regarding other controllable conditions as well.

In accordance with the present invention, one or more contacting airspeed indicators are arranged to operate a multi-channel transmitter in the pilotless aircraft for the purpose of transmitting signals indicative of the approximate airspeed. A multi-channel receiver in the "mother" plane or other control station selectively operates suitable indicators such as a set of lamps to indicate the approximate airspeed of the pilotless aircraft.

For a better understanding of the invention together with other and further objects thereof, reference is had to the following detailed description taken in connection with the accompanying drawing which presents a schematic diagram of a system embodying the invention.

The portion of the system adapted to be installed in the controlled aircraft is shown in the upper half of the drawing. Two contacting airspeed indicators 1 and 2 are installed in the aircraft and are adjusted so that each is responsive to a predetermined range of airspeed values. These indicators are of a well-known type in which a movable contact arm 3 is arranged to alternatively engage two spaced contacts 4 and 5, or to remain in position between these contacts depending upon the airspeed. By way of example, the indicator 1 is so adjusted that its contact 4 closes when the airspeed is above 95 miles per hour and its contact 5 is closed when the airspeed is below 75 miles per hour, neither of the contacts 4 and 5 being engaged by the contactor 3 when the airspeed is between these two limits. Similarly, the indicator 2 is so adjusted that its contact 4 closes when the airspeed is above 85 miles per hour and its contact 5 is closed when the airspeed is below 65 miles per hour, neither of the contacts 4 and 5 of this indicator being engaged by the contactor 3 when the airspeed is intermediate the two limiting values.

The contactors 3 of the indicators 1 and 2 are electrically connected to the positive terminal of a suitable voltage source, the other terminal of this source being grounded to the metallic body of the aircraft. Contacts 4 and 5 of indicator 1 are respectively connected through windings of relays 6 and 7 to ground. Contacts 4 and 5 of indicator 2 are respectively connected through windings of relays 8 and 9 to ground. Relay 6 has a contact 10 which is normally closed when the relay is deenergized and a contact 11 which is closed only when the relay is energized. Relay contacts 10 and 11 are respectively connected in circuits for operating audio oscillators 12 and 13. The movable contact blade 14 of relay 6 which cooperates with the contacts 10 and 11 is electrically connected to a normally open contact 15 of relay 8. A normally closed contact 16 of relay 8 is connected in the operating circuit for an audio oscillator 17. The movable contact blade 18 of relay 8 is electrically connected to a normally closed contact 19 of relay 7. A movable blade 20 of this relay is grounded. A normally open contact 21 of relay 7 is electrically connected to the blade 22 of relay 9. A normally closed contact 23 of relay 9 is in the operating circuit for an audio oscillator 24.

The audio oscillators 12, 13, 17 and 24 are embodied in separate transmitting channels, being adapted to modulate a transmitter 25 at different audio frequencies. Inasmuch as conventional circuits may be employed in the oscillators and transmitter, these details are not illustrated herein. The audio oscillators are rendered operative selectively, as will be described with reference to specific examples.

It will be assumed that the upper safe limit of the airspeed for landing purposes is 95 miles per hour while the lower safe limit is 65 miles per hour, and that preferably the pilotless aircraft should be traveling between 75 and 85 miles per hour in order properly to effect a landing. If the aircraft is traveling at greater than 95 miles per hour, contact 4 of indicator 1 closes causing relay 6 to energize and close its contact 11 while opening its contact 10. Contact 4 of indicator 2 also closes, energizing relay 8 which thereupon closes its contact 15 and opens its contact 16. Relays 7 and 9 remain deenergized. A circuit is established from ground at blade 20 through relay contacts 19, 15 and 11 to audio oscillator 13 which commences operating to modulate the transmitter 25 at a first audio frequency.

If the pilotless aircraft is traveling with an airspeed greater than 85 miles per hour, but less than 95 miles per hour, the contact 4 of indicator 2 is closed and all the remaining contacts of indicators 1 and 2 are open. Under these circumstances, relay 8 energizes and relays 6, 7 and 9 remain deenergized. Circuit from ground is extended through relay contacts 19, 15 and 10 to the audio oscillator 12 which operates to modulate the transmitter output at a second audio frequency.

For an airspeed between 75 and 85 miles per hour, none of the relays 6, 7, 8 and 9 is energized, and circuit from ground is extended through relay contacts 19 and 16 to the audio oscillator 17 which operates to modulate the transmitter output at a third audio frequency.

With the airspeed between 65 and 75 miles per hour the contact 5 of indicator 1 closes, energizing the relay 7, circuit is established from ground through relay contacts 21 and 23 to audio oscillator 24 for producing audio modulation at a fourth audio frequency.

If the airspeed drops below 65 miles per hour, contact 5 of indicator 2 closes, energizing the relay 9 which thereupon opens its contact 23. Under these circumstances none of the audio oscillators 12, 13, 17 and 24 is energized. If desired, a fifth audio oscillator (not shown) may be arranged to operate at a fifth audio frequency in the event the other four channels are quiet, or the fifth channel may be represented merely by the unmodulated carrier.

At the control station, which may be located in the "mother" plane as aforesaid, a receiver 30 feeds the incoming signals to a group of band-pass filters 31, 32, 33 and 34, each of which is adapted to pass a particular one of the four audio frequencies which represent the transmitting channels controlled by the audio oscillators 13, 12, 17 and 24, respectively. The band-pass filters 31, 32, 33 and 34, through the medium of relay tubes 35, 36, 37 and 38, respectively, control the operation of relays 40, 41, 42 and 43. A set of five visual indicators such as the lamps 45, 46, 47, 48 and 49 is controlled by the relays 40, 41, 42 and 43 in a manner which will be described presently.

Assuming that the speed of the pilotless aircraft is above 95 miles per hour the audio oscillator 13 in the controlled aircraft is rendered effective to generate a signal which is transmitted by the transmitter 25 to the control station where it is received by the receiver 30 and passed through the filter 31 to the relay tube 35. The signal applied to the tube 35 causes energization of relay 40 which closes a normally open relay contact 50 and opens a normally closed contact 51. Positive potential from a suitable voltage source is permanently applied to the contact blade 52 of relay 40 and this voltage is impressed through relay contact 50 upon one terminal of the lamp 45, the other terminal of which is grounded. Lamp 45 thereupon lights to furnish an indication to the remote control operator that the pilotless aircraft is traveling at an airspeed greater than 95 miles per hour.

For airspeeds between 85 and 95 miles per hour, as described hereinabove, the audio oscillator 12 in the transmitting set generates a signal which is passed by the filter 32 in the receiving set at the control station. Relay tube 36 is thus activated to produce energization of the relay 41. Contact 53 of relay 41 closes while contact 54 of this relay is opened. Circuit is completed from the positive voltage source through relay contacts 51 and 53 and the filament of lamp 46 to ground. Lamp 46 lights, indicating an airspeed between 85 and 95 miles per hour.

With the airspeed of the pilotless aircraft between the desired limits of 75 and 85 miles per hour, audio oscillator 17 is operated to furnish the control signal which is passed by the filter 33 and applied to relay tube 37. Relay 42 is energized to close its contact 55 and open its contact 56. Circuit is extended through the relay contacts 51, 54 and 55 to the lamp 47, the illumination of which indicates an airspeed between 75 and 85 miles per hour.

Airspeeds between 65 and 75 miles per hour are effective to excite the fourth transmitting channel (audio oscillator 24) whereupon signal is passed by filter 34 and applied to relay tube 38. Relay 43 energizes, closing its contact 57 and opening its contact 58. Circuit for energizing lamp 49 is extended through relay contacts 51, 54, 56 and 57. Lamp 49 lights to indicate an airspeed between 65 and 75 miles per hour.

For airspeeds below 65 miles per hour, none of the relays 40, 41, 42 or 43 is energized and circuit is established from the positive voltage source through relay contacts 51, 54, 56 and 58 to the lamp 48. Illumination of lamp 48 indicates airspeeds below 65 miles per hour. It has been mentioned hereinabove that the fifth transmitting channel may be represented by the unmodulated carrier radiated by the transmitter 25. As the receiver 30 is equipped with automatic volume control, there may be a tendency for it to become unduly noisy and hence it may be desirable for this reason to provide a fifth audio oscillator for the purpose of keeping the receiver quiet under these circumstances. Signals received in this fifth channel would not be passed by any of the band-pass filters 31, 32, 33 and 34.

The remote control operator is thus kept informed as to whether or not the airspeed of the pilotless aircraft is within the proper range of values to safely effect a landing. If the speed is not as desired, it is adjusted by remote control until the necessary safe condition is attained, as may be indicated, for instance, by the illumination of lamp 47.

It will be seen from the foregoing that the present invention is a useful aid to the remote control of aircraft. It has been described herein as being adapted to afford remote visual indication of airspeed. However, it will be understood that it can readily be adapted to the indication of factors other than airspeed. Variations and modifications of the disclosed apparatus may readily occur to persons skilled in the art without departing from the spirit of the invention.

What is claimed is:

1. In a system for transmitting approximate airspeed readings from a remotely controlled flying aircraft to a control station comprising, in said aircraft, a first contacting airspeed indicator having two alternative contact-making positions respectively corresponding to upper and lower limits of a predetermined range of airspeed values, first and second relays controlled by said first airspeed indicator and arranged to operate respectively when said first indicator is in either of its contact-making positions, a second contacting airspeed indicator having two alternative contact-making positions respectively corresponding to upper and lower limits of another predetermined range of airspeed values, third and fourth relays controlled by said second airspeed indicator and arranged to operate respectively when said second indicator is in either of its contact-making positions, a transmitter, first, second, third and fourth audio oscillators each effective when operated to modulate the output of said transmitter at a separate audio frequency, said first audio oscillator being arranged to operate when said first and third relays are concurrently operated, said second oscillator operating when said third relay alone is operated, said third oscillator operating when none of said first, second, third and fourth relays is operated, said fourth oscillator operating when said second relay alone is operated, none of said oscillators operating when said fourth relay is operated.

2. In a system for transmitting data from a remotely controlled aircraft to a control station comprising, in said aircraft, a first contacting indicator having alternative contact-making positions respectively corresponding to upper and lower limits of a predetermined range of data values, first and second relays controlled by said first indicator and arranged to operate respectively when said first indicator is in either of its contact-making positions, a second contacting indicator having alternative contact-making positions respectively corresponding to upper and lower limits of another predetermined range of data values, third and fourth relays controlled by said second indicator and arranged to operate respectively when said second indicator is in either of its contact-making positions, a radio transmitter, first, second, third and fourth audio oscillators each effective when operated to modulate the output of said transmitter at a separate audio frequency, said first audio oscillator being arranged to operate when said first and third relays are concurrently operated, said second oscillator operating when said third relay alone is operated, said third oscillator operating when none of said first, second, third and fourth relays is operated, said fourth oscillator operating when said second relay alone is operated.

3. In a system for transmitting data from a remotely controlled aircraft to a control station comprising, in said aircraft, a first contacting indicator having alternative contact-making positions, first and second relays controlled by said first indicator and arranged to operate respectively when said first indicator is in either of its contact-making positions, a second contacting indicator having alternative contact-making positions, third and fourth relays controlled by said second indicator and arranged to operate respectively when said second indicator is in either of its contact-making positions, a radio transmitter, first, second, third and fourth audio oscillators each effective when operated to modulate the output of said transmitter at a separate audio frequency, said first audio oscillator being arranged to operate when said first and third relays are concurrently operated, said second oscillator operating when said third relay alone is operated, said third oscillator operating when none of said first, second, third and fourth relays is operated, said fourth oscillator operating when said second relay alone is operated.

PETER R. MURRAY.

REFERENCES CITED

The following references are of record in the file of this patent:

UNITED STATES PATENTS

| Number | Name | Date |
|---|---|---|
| 1,633,100 | Heising | June 21, 1927 |
| 1,673,588 | Pierce | June 12, 1928 |
| 1,786,841 | Gilbert | Dec. 30, 1930 |
| 1,801,466 | Townsend | Apr. 21, 1931 |
| 2,148,578 | Pullis | Feb. 28, 1939 |
| 2,192,242 | Robinson | Mar. 5, 1940 |

FOREIGN PATENTS

| Number | Country | Date |
|---|---|---|
| 267,925 | Italy | Sept. 26, 1929 |